(12) United States Patent
Higaki et al.

(10) Patent No.: US 11,228,247 B2
(45) Date of Patent: Jan. 18, 2022

(54) PARALLEL POWER SUPPLY DEVICE

(71) Applicant: Mitsubishi Electric Corporation, Chiyoda-ku (JP)

(72) Inventors: Yusuke Higaki, Chiyoda-ku (JP); Hidehito Yoshida, Chiyoda-ku (JP); Yu Kawai, Chiyoda-ku (JP); Takahiro Kato, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/650,067

(22) PCT Filed: Nov. 24, 2017

(86) PCT No.: PCT/JP2017/042225
§ 371 (c)(1),
(2) Date: Mar. 24, 2020

(87) PCT Pub. No.: WO2019/102587
PCT Pub. Date: May 31, 2019

(65) Prior Publication Data
US 2020/0259418 A1 Aug. 13, 2020

(51) Int. Cl.
*H02M 3/335* (2006.01)
*H02M 3/158* (2006.01)

(52) U.S. Cl.
CPC ..... *H02M 3/1584* (2013.01); *H02M 3/33584* (2013.01)

(58) Field of Classification Search
CPC ....... H02J 1/102; H02M 3/1584; H02M 3/285
See application file for complete search history.

(56) References Cited

U.S. PATENT DOCUMENTS

2016/0013721 A1* 1/2016 Garcia Soto ............ H02M 1/14
323/271
2016/0248325 A1* 8/2016 Tajima ................ H02M 3/1582
(Continued)

FOREIGN PATENT DOCUMENTS

JP 1-209924 A 8/1989
JP 2003-235252 A 8/2003
(Continued)

OTHER PUBLICATIONS

International Search Report dated Jan. 9, 2018 in PCT/JP2017/042225 filed Nov. 24, 2017, 2 pages.

*Primary Examiner* — Peter M Novak
(74) *Attorney, Agent, or Firm* — Xsensus LLP (57) ABSTRACT

A parallel power supply device according to the present invention includes: a plurality of DC/DC converters connected in parallel to perform power conversion between a DC power supply and a common load; a voltage detector to detect a voltage of the common load; and a plurality of control circuits each to control a corresponding one of the plurality of DC/DC converters, wherein during parallel operation of the plurality of DC/DC converters, the plurality of control circuits control the plurality of DC/DC converters by proportional control using a same target voltage value and a same proportional gain, based on a voltage value of the common load detected by the voltage detector. Therefore, in the parallel power supply device in which the plurality of DC/DC converters are connected in parallel, the individual DC/DC converters can supply electric power to the load independently and equally.

12 Claims, 5 Drawing Sheets

(56) References Cited

U.S. PATENT DOCUMENTS

| | | | |
|---|---|---|---|
| 2017/0063235 A1* | 3/2017 | Sreenivas | H02M 3/1588 |
| 2017/0237349 A1* | 8/2017 | Labib | H02M 3/1584 |
| | | | 323/271 |
| 2018/0191333 A1* | 7/2018 | Chen | H02M 3/1584 |

FOREIGN PATENT DOCUMENTS

| | | |
|---|---|---|
| JP | 4191625 B2 | 9/2008 |
| JP | 2009-213239 A | 9/2009 |
| JP | 2010-252591 A | 11/2010 |
| JP | 2011-199996 A | 10/2011 |
| JP | 2012-19646 A | 1/2012 |

\* cited by examiner

PARALLEL POWER SUPPLY DEVICE

TECHNICAL FIELD

The present invention relates to a parallel power supply device in which two or more DC/DC converters are connected in parallel to a common load.

BACKGROUND ART

For example, in a power conditioner for an uninterruptible power supply device or a storage battery, a parallel power supply device is used to supply electric power to an electric load that requires a large current. In the parallel power supply device, a plurality of power conversion devices are connected in parallel to a common voltage source and electric power is supplied from the plurality of power conversion devices to the electric load.

In the parallel power supply device, equalization of output currents from the power conversion devices is required in order to prevent a load from concentrating on a particular power conversion device of the plurality of power conversion devices connected in parallel. A conventional parallel power supply device includes a DC power supply, a plurality of DC/DC converters connected in parallel, a load, current detection means for detecting an output current of the DC power supply, and a control device that calculates a current to be output by each DC/DC converter based on a signal output by the current detection means and transmits the current to each DC/DC converter as a signal of a current command value. Each DC/DC converter controls the output current based on the current command value transmitted from the control circuit, thereby equalizing a current to be supplied to a common load to which each DC/DC converter is connected in common (refer to, for example, PTL 1).

CITATION LIST

Patent Literature

PTL 1: Japanese Patent Laying-Open No. 1-209924

SUMMARY OF INVENTION

Technical Problem

In the parallel power supply device described in PTL 1 above, output current values of a plurality of power supply devices connected in parallel are equalized, and thus, concentration of output power on a part of the DC/DC converters during operation of the load can be avoided. However, it is necessary to provide a controller that calculates and transmits the input current command value of each DC/DC converter. In this case, when the number of the power supplies connected in parallel in the parallel power supply device is increased, for example, it is necessary to change a program of the controller, in addition to the increase in the number of the power supplies connected in parallel. Therefore, the parallel power supply device in which the single controller collectively controls the plurality of converters has a problem of difficulty in changing the device configuration.

The present invention has been made to solve the above-described problem, and an object of the present invention is to provide a parallel power supply device in which individual converters can supply electric power to a load independently and equally, without using a controller that collectively controls a plurality of converters.

Solution to Problem

A parallel power supply device according to the present invention includes: a plurality of DC/DC converters connected in parallel to perform power conversion between a DC power supply and a common load; a voltage detector to detect a voltage of the common load; and a plurality of control circuits each to control a corresponding one of the plurality of DC/DC converters, wherein during parallel operation of the plurality of DC/DC converters, the plurality of control circuits control the plurality of DC/DC converters by proportional control using a same target voltage value and a same proportional gain, based on a voltage value of the common load detected by the voltage detector.

Advantageous Effects of Invention

In the parallel power supply device in which the plurality of DC/DC converters are connected in parallel, the individual DC/DC converters can supply electric power to the common load independently and more equally.

DESCRIPTION OF EMBODIMENTS

First Embodiment

Figure 1:
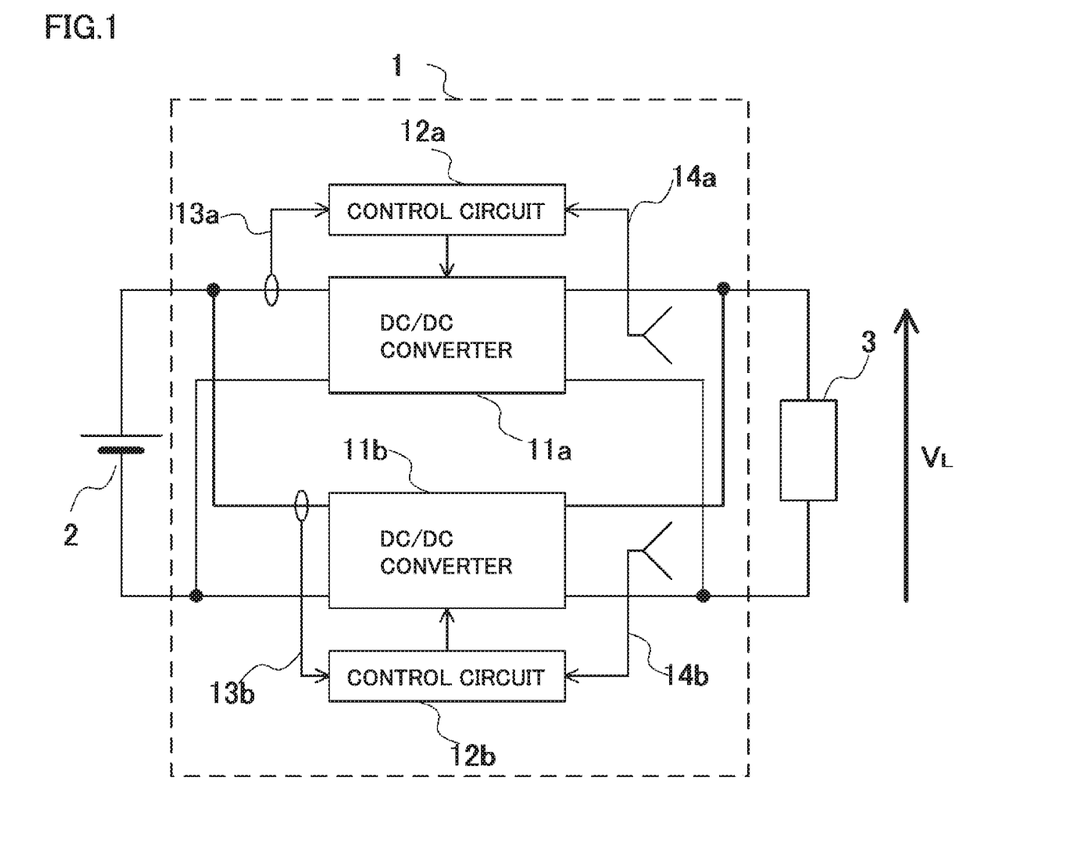
FIG. 1 is a block diagram showing a basic configuration of a parallel power supply device according to a first embodiment of the present invention.

A parallel power supply device according to a first embodiment of the present invention will be described with reference to the drawings. FIG. 1 is a block diagram showing a configuration of the parallel power supply device according to the first embodiment of the present invention. As shown in FIG. 1, a parallel power supply device 1 according to the first embodiment is connected to a DC power supply 2 and a common load 3, and performs power conversion of a DC voltage output from DC power supply 2 and outputs the converted voltage to common load 3. Although electric power supply from DC power supply 2 to common load 3 will be described here, electric power may be supplied bidirectionally.

In the drawings or the following description, the same or corresponding components are denoted by the same reference characters. When there are a plurality of same or corresponding components like DC/DC converters, the components are distinguished by using numerals and alphabets, like DC/DC converter 11a, 11b.

When the components are not distinguished or when the components are collectively called, the alphabets are omitted, like DC/DC converter 11.

In FIG. 1, parallel power supply device 1 includes two DC/DC converters 11a and 11b, two control circuits 12a and 12b that each controls corresponding DC/DC converter 11, two current detectors 13a and 13b that each detects an input current to corresponding DC/DC converter 11, and two voltage detectors 14a and 14b that each detects an output voltage of corresponding DC/DC converter 11. Although FIG. 1 shows the configuration in which two DC/DC converters 11 are connected in parallel to one DC power supply 2, the present invention is not limited thereto. Three or more DC/DC converters 11 may be connected in parallel.

Each DC/DC converter 11 is a power conversion circuit having a plurality of switching elements, and performing power conversion of an input DC voltage and outputting the converted voltage. Each DC/DC converter 11 has one end connected to DC power supply 2. DC/DC converters 11 are connected to each other in parallel. DC/DC converters 11 can perform parallel operation, i.e., each of DC/DC converters 11 connected in parallel can perform power conversion of an input voltage from DC power supply 2 and output the converted voltage to the common load 3. Each DC/DC converter 11 has the other end connected to common load 3. Corresponding control circuit 12 is connected to DC/DC converter 11 and DC/DC converter 11 operates based on a control signal provided from control circuit 12.

Two control circuits 12 are provided to correspond to DC/DC converters 11 and each of control circuits 12 is connected to corresponding DC/DC converter 11. In addition, each control circuit 12 is connected to current detector 13 and voltage detector 14. Each control circuit 12 controls corresponding DC/DC converter 11 by generating a control signal based on a current (converter input current) detected by current detector 13 and flowing from the DC power supply 2 side into DC/DC converter 11 and a voltage (common load voltage $V_L$) of common load 3 detected by voltage detector 14, and outputting the control signal to corresponding DC/DC converter 11. That is, control circuit 12 controls the converter input current of corresponding DC/DC converter 11 and controls common load voltage $V_L$. Hereinafter, the current flowing into DC/DC converter 11 will be referred to as "converter input current", and the current output from the DC/DC converter 11 to the common load 3 side will be referred to as "converter output current".

Current detector 13 is a detection circuit that detects the magnitude of the converter input current of corresponding DC/DC converter 11, and voltage detector 14 is a detection circuit that detects common load voltage $V_L$. The results of detection by each current detector 13 and each voltage detector 14 are output to corresponding control circuit 12.

DC power supply 2 is a power supply device that outputs the DC voltage, and is a battery, for example. DC power supply 2 may rectify an AC voltage supplied from an AC power supply by a rectifier circuit and the like. Common load 3 is a resistor that consumes electric power, and is connected to two DC/DC converters 11. Common load 3 may be a device that operates using the DC voltage as an input, such as, for example, an inverter.

Figure 2:
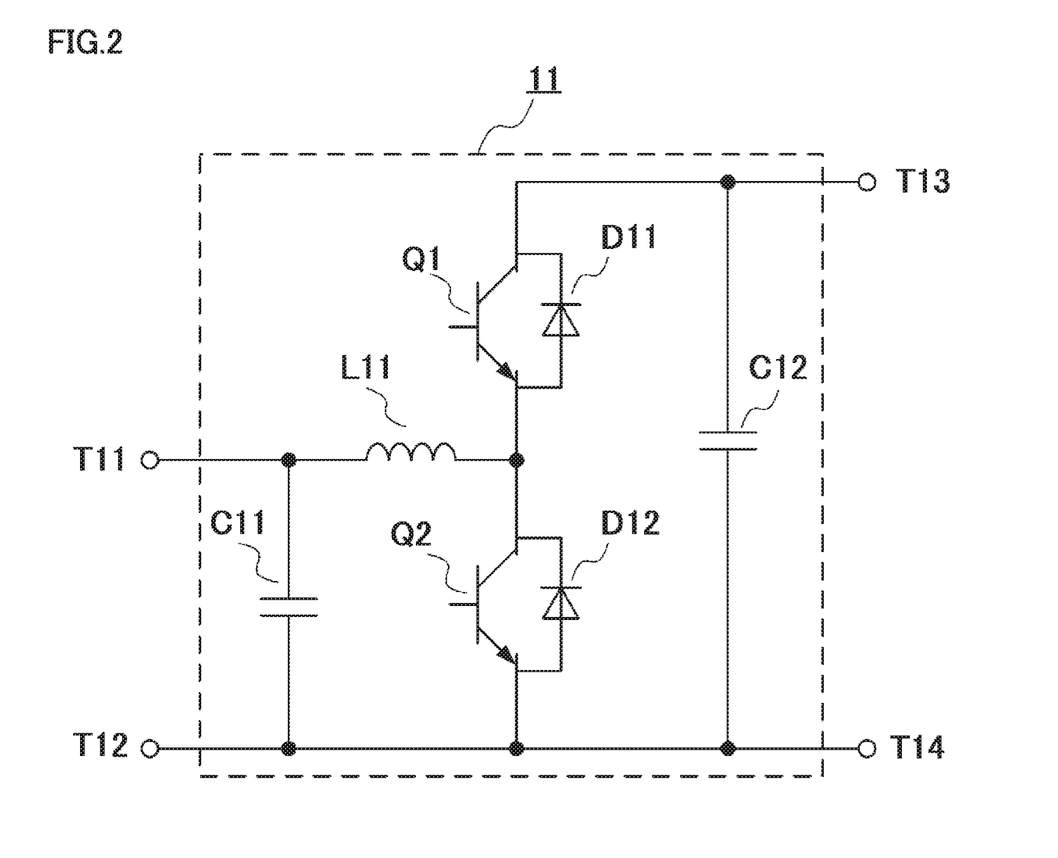
FIG. 2 is a block diagram showing a configuration of a DC/DC converter used in the parallel power supply device according to the first embodiment of the present invention.

Next, a configuration of DC/DC converter 11 will be described. FIG. 2 shows one example of a circuit configuration of DC/DC converter 11. DC/DC converter 11 shown in FIG. 2 includes two semiconductor switching elements Q1 and Q2 having antiparallel diodes D11 and D12 connected thereto, respectively, a reactor L1, and capacitors C11 and C12. DC/DC converter 11 has a first terminal T11 to a fourth terminal T14, DC power supply 2 is connected to first terminal T11 and second terminal T12, and common load 3 is connected to third terminal T13 and fourth terminal T14.

Capacitor C11 has one end connected to first terminal T11 and the other end connected to second terminal T12. Reactor L11 has one end connected to first terminal T11 and the other end connected to a connection point of semiconductor switching element Q1 and semiconductor switching element Q2. Semiconductor switching elements Q1 and Q2 are connected in series and the other terminal of semiconductor switching element Q1 is connected to the third terminal T13. The other terminal of semiconductor switching element Q2 is connected to second terminal T12 and fourth terminal T14. Capacitor C12 has one end connected to third terminal T13 and the other end connected to fourth terminal T14.

DC/DC converter 11 shown in FIG. 2 operates as a boost converter and a step-down converter. That is, DC/DC converter 11 boosts DC power input from the first terminal T11 and second terminal T12 side by turning on and off semiconductor switching element Q2, and supplies the electric power to the third terminal T13 and fourth terminal T14 side. In addition, DC/DC converter 11 steps down DC power input from the third terminal T13 and fourth terminal T14 side by turning on and off semiconductor switching element Q1, and supplies the electric power to the third terminal T13 and fourth terminal T14 side. Control circuit 12 controls two semiconductor switching elements Q1 and Q2 to thereby adjust a current flowing through reactor L11.

Figure 3:
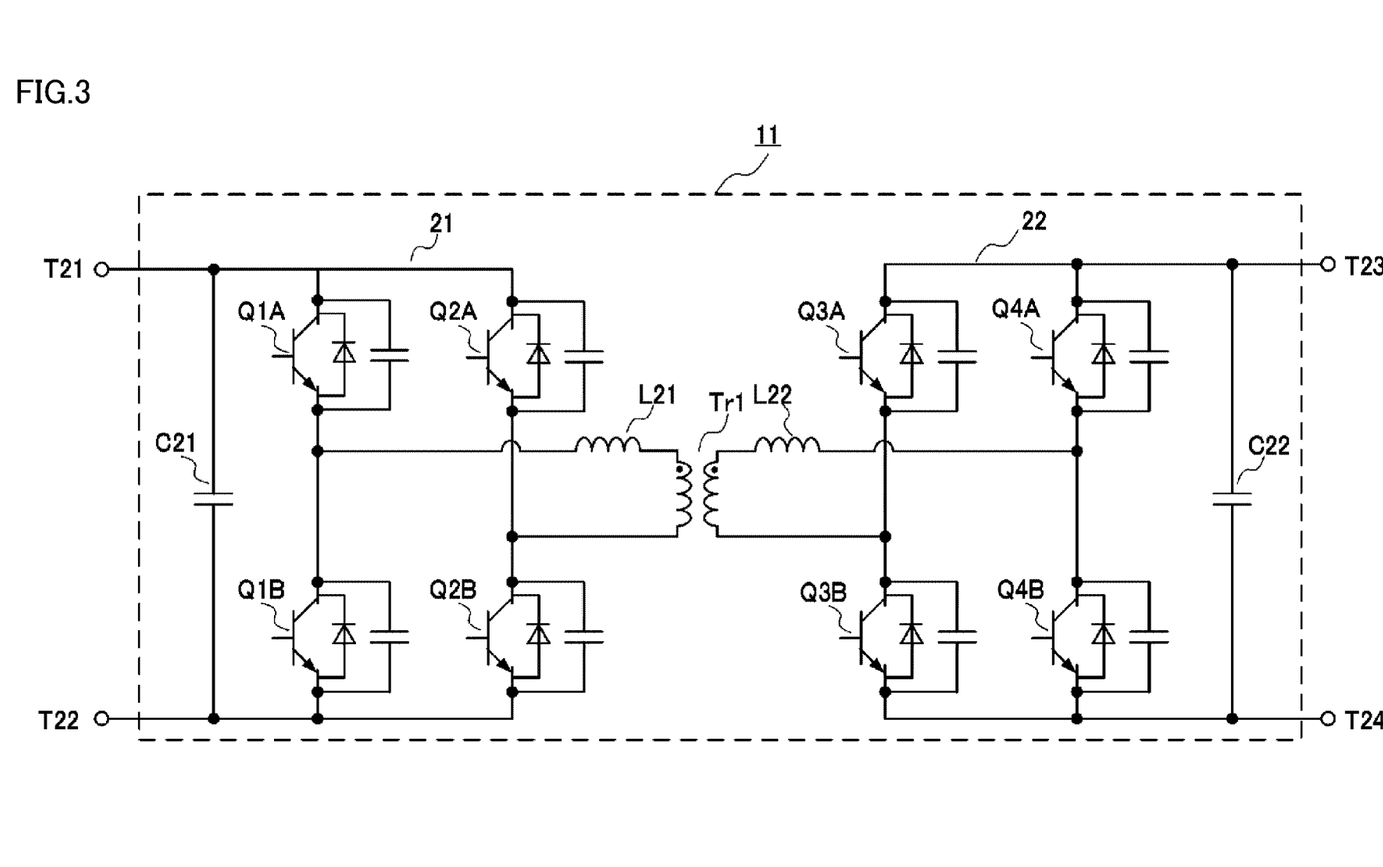
FIG. 3 is a block diagram showing a configuration of the DC/DC converter used in the parallel power supply device according to the first embodiment of the present invention.

The configuration of DC/DC converter 11 is not limited to the configuration shown in FIG. 2, and any configuration may be used as long as DC/DC converter 11 performs power conversion of the DC voltage. For example, a DC/DC converter including a transformer as shown in FIG. 3 may be used. The DC/DC converter shown in FIG. 3 includes the transformer between an input end and an output end, and thus, the DC/DC converter shown in FIG. 3 can be used for applications that require the insulation property of the DC/DC converter.

DC/DC converter 11 shown in FIG. 3 includes a transformer Tr1, a first full-bridge circuit 21 formed by two bridge circuits including a plurality of semiconductor switching elements Q1A, Q1B, Q2A, and Q2B each having an antiparallel diode connected thereto, a second full-bridge circuit 22 formed by two bridge circuits including a plurality of semiconductor switching elements Q3A, Q3B, Q4A, and Q4B each having an antiparallel diode connected thereto, capacitors C21 and C22, and reactors L21 and L22. Similarly to DC/DC converter 11 shown in FIG. 2, DC/DC converter 11 shown in FIG. 3 has first terminal T21 to fourth terminal T24, DC power supply 2 is connected to first terminal T21 and second terminal T22, and common load 3 is connected to third terminal T23 and fourth terminal T24.

First full-bridge circuit 21 is connected between first and second terminals T21 and T22 and a first winding of transformer Tr1, and performs DC/AC power conversion. Second full-bridge circuit 22 is connected between third and fourth terminals 123 and 124 and a second winding of transformer Tr1, and performs DC/AC power conversion.

The first winding of transformer Tr1 has one end connected to a connection point of semiconductor switching element Q1A and semiconductor switching element Q1B through reactor L21, and the other end connected to a connection point of semiconductor switching element Q2A and semiconductor switching element Q2B. Similarly, the second winding of transformer Tr1 has one end connected to a connection point of semiconductor switching element Q4A and semiconductor switching element Q4B through reactor L22, and the other end connected to a connection point of semiconductor switching element Q3A and semiconductor switching element Q3B.

First full-bridge circuit 21 and second full-bridge circuit 22 are zero voltage switching circuits that can set, at almost zero voltage, voltages across the terminals of semiconductor switching elements Q1A, Q1B, Q2A, and Q2B and Q3A, Q3B, Q4A, and Q4B of the respective full-bridge circuits during switching. A capacitor is connected in parallel to each of semiconductor switching elements Q1A to Q4A and Q1B to Q4B.

Figure 4:
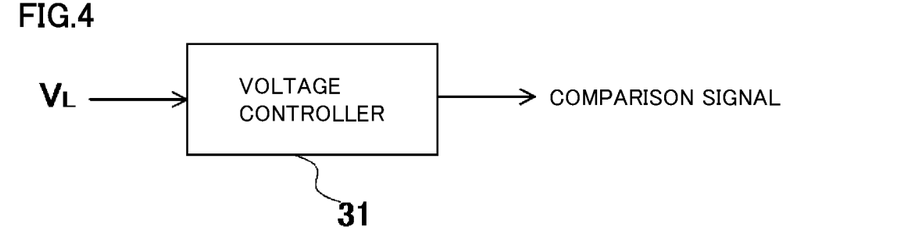
FIG. 4 is a block diagram showing a configuration of a control circuit of the parallel power supply device according to the first embodiment of the present invention.

A configuration of control circuit 12 will be described. FIG. 4 shows the configuration of control circuit 12. As shown in FIG. 4, control circuit 12 includes a voltage controller 31. Voltage controller 31 is a portion that makes voltage adjustment such that common load voltage $V_L$ falls within a proper range during parallel operation of DC/DC converters 11, and outputs a converter input current command value of corresponding DC/DC converter 11 to corresponding DC/DC converter 11.

Figure 5:
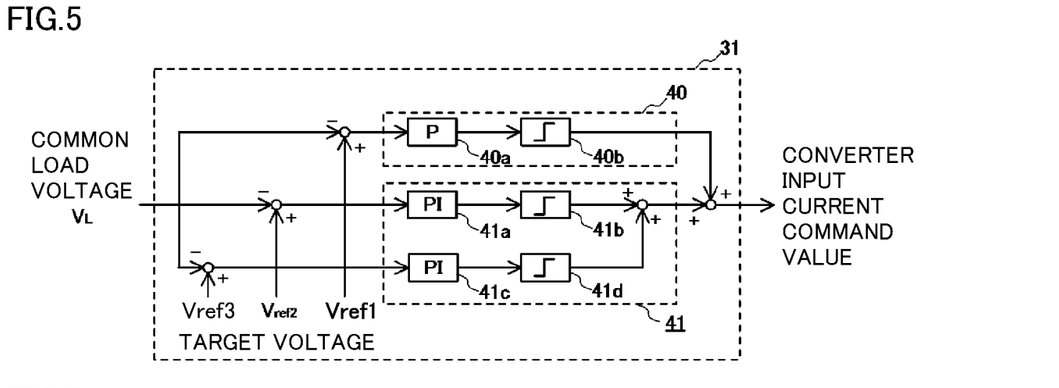
FIG. 5 is a block diagram showing a configuration of a voltage controller of the parallel power supply device according to the first embodiment of the present invention.

A configuration of voltage controller 31 will be described. FIG. 5 shows the configuration of voltage controller 31 of control circuit 12 in the present embodiment. Voltage controller 31 shown in FIG. 5 operates to control common load voltage $V_L$ and generates the converter input current command value of corresponding DC/DC converter 11.

Voltage controller 31 includes a voltage computing unit 40 and an over/under-voltage computing unit 41 that are in parallel. Voltage computing unit 40 includes one proportional controller 40a and one limiter 40b. Over/under-voltage computing unit 41 includes a proportional integral controller 41a (first proportional integral controller) and a proportional integral controller 41c (second proportional integral controller) that include integral elements, and limiters 41b and 41d.

Voltage controller 31 calculates a sum of outputs from voltage computing unit 40 and over/under-voltage computing unit 41 to thereby calculate the converter input current command value of DC/DC converter 11. A difference between common load voltage $V_L$ and a target voltage set for each controller is input to each of proportional controller 40a and two proportional integral controllers 41a and 41c. Different target voltages are set for the proportional controller and the proportional integral controllers. A predetermined target voltage $V_{ref1}$ (first target voltage value) is set for proportional controller 40a, a target voltage $V_{ref2}$ (second target voltage value) larger than target voltage $V_{ref1}$ of proportional controller 40a is set for proportional integral controller 41a, and a target voltage $V_{ref3}$ (third target voltage value) smaller than target voltage $V_{ref1}$ of proportional controller 40a is set for proportional integral controller 41c.

Proportional controller 40a performs control such that the converter output current from corresponding DC/DC converter 11 becomes equal to the converter output current from another DC/DC converter 11. When proportional integral control, not proportional control, is used, an imbalance may be created between the converter output currents due to an influence of sensor error and the like, and thus, the converter output currents do not become equal in some cases. In contrast, in DC/DC converter 11 according to the present embodiment, proportional control is basically used in voltage controller 31.

When proportional control is used, the difference between common load voltage $V_L$ and target voltage $V_{ref1}$ is input and a result obtained by multiplying the difference by a proportional gain is output. Therefore, the influence of sensor error is not accumulated and a significant imbalance is not created. Therefore, by individually performing proportional control using the same target voltage $V_{ref1}$ and the same proportional gain in proportional controllers 40a of DC/DC converters 11, the converter input current command values of all DC/DC converters 11 can be equalized. In addition, when voltages of DC power supplies 2 connected to DC/DC converters 11 are equal and conversion efficiencies of DC/DC converters 11 are equal, the converter input and output currents can be equalized.

However, when only proportional control is used, a steady deviation of voltage controller 31 always occurs, and thus, common load voltage $V_L$ may deviate from a permissible range. Therefore, proportional integral controller 41a and proportional integral controller 41c that are connected in parallel to proportional controller 40a are used. Proportional integral controllers 41a and 41c operate when common load voltage $V_L$ deviates from the permissible range, and perform proportional integral control that does not cause a steady deviation, in order to reliably maintain common load voltage $V_L$ within the proper range. Outputs of proportional controller 40a and two proportional integral controllers 41a and 41c are provided with limiters 40b, 41b and 41d, respectively. Limiters 40b, 41b and 41d are for limiting values output by proportional controller 40a and two proportional integral controllers 41a and 41c such that the values fall within predetermined ranges.

When the outputs of the two proportional integral controllers 41a and 41c are larger than preset upper limit values of limiters 41b and 41d, the upper limit values are output. When the outputs of two proportional integral controllers 41a and 41c are smaller than preset lower limit values of limiters 41b and 41d, the lower limit values are output. The upper limit values and the lower limit values of limiters 41b and 41d connected to two proportional integral controllers 41a and 41c, respectively, are set at different values for reasons described below. The upper limit value of limiter 41b that limits the output of proportional integral controller 41a is set at zero, and the lower limit value of limiter 41b is set at an arbitrary value. The upper limit value of limiter 41d that limits the output of proportional integral controller 41c is set at an arbitrary value, and the lower limit value of limiter 41d is set at zero. In addition, by setting the lower limit value of limiter 41b at a lower limit value of an input current rating of DC/DC converter 11 and setting the upper limit value of limiter 41d at an upper limit value of the input current rating of DC/DC converter 11, it is possible to prevent the input current of DC/DC converter 11 from exceeding the rating.

Next, the operation will be described.

The DC power output from DC power supply 2 is input to two DC/DC converters 11a and 11b. Each of current detectors 13a and 13b detects the current (converter input current) input to corresponding DC/DC converter 11, and outputs the detection result to corresponding control circuit 12. Each of voltage detectors 14a and 14b detects the voltage (common load voltage VL) of common load 3, and outputs the detection result to corresponding control circuit 12. Control circuit 12 that receives the detection results from current detector 13 and voltage detector 14 controls corresponding DC/DC converter 11, based on these detection results. DC/DC converter 11 performs power conversion of the DC power input based on the control signal provided from corresponding control circuit 12, and outputs the converted power to the common load 3. Details of the operation of the control circuit will be described below.

When common load voltage $V_L$ is smaller than target voltage $V_{ref2}$ of proportional integral controller 41a and larger than target voltage $V_{ref3}$ of proportional integral controller 41c, an integral value of a voltage error of proportional integral controller 41a increases and an integral value of a voltage error of proportional integral controller 41c decreases. Therefore, the output of proportional integral controller 41a increases to the upper limit value set by limiter 41b, and the output of proportional integral controller 41c decreases to the lower limit value set by limiter 41d. As described above, the upper limit value of limiter 41b and the lower limit value of limiter 41d are set at zero, and thus, the output of over/under-voltage computing unit 41 is zero. As a result, the converter input current command value generated by voltage controller 31 is equal to the output of proportional controller 40a, and thus, a control response of voltage controller 31 is a proportional control response and common load voltage $V_L$ to be controlled in a steady state is controlled to the target voltage of proportional controller 40a, i.e., $V_{ref1}$. In addition, as described above, the proportional gains of DC/DC converters 11 are set at an equal value, and thus, the output currents of the plurality of DC/DC converters 11 are equalized.

When common load voltage $V_L$ is larger than target voltage $V_{ref2}$ of proportional integral controller 41a, common load voltage $V_L$ is larger than target voltage $V_{ref3}$ of proportional integral controller 41c, and thus, negative values are integrated to the outputs of two proportional integral controllers 41a and 41c. Therefore, the outputs of limiters 41b and 41d continue to decrease to the lower limit values set by limiters 41b and 41d. At this time, the lower limit value of limiter 41d is set at zero, and thus, the output of proportional integral controller 41c is limited by limiter 41d to become zero. As a result, the converter input current command value is expressed as a sum of the outputs of proportional controller 40a and proportional integral controller 41a. The converter input current command value in this case includes the output of proportional integral controller 41a, and thus, a control response of voltage controller 31 is a proportional integral control response and common load voltage $V_L$ to be controlled in a steady state is controlled to the target voltage of proportional integral controller 41a, i.e., $V_{ref2}$.

When common load voltage $V_L$ is smaller than target voltage $V_{ref3}$ of proportional integral controller 41c, common load voltage $V_L$ is smaller than target voltage $V_{ref2}$ of proportional integral controller 41a, and thus, positive values are added to the outputs of two proportional integral controllers 41a and 41c. Therefore, the outputs of limiters 41b and 41d continue to increase to the upper limit values set by limiters 41b and 41d. At this time, the upper limit value of limiter 41b is set at zero, and thus, the output of proportional integral controller 41a is limited by limiter 41b to become zero. As a result, the converter input current command value is expressed as a sum of the outputs of proportional controller 40a and proportional integral controller 41c. The converter input current command value in this case includes the output of proportional integral controller 41c, and thus, a control response of voltage controller 31 is a proportional integral control response and common load voltage $V_L$ to be controlled in a steady state is controlled to the target voltage of proportional integral controller 41c, i.e., $V_{ref3}$.

In the parallel power supply device according to the first embodiment, the above-described voltage control is performed, and thus, the proportional integral control operation is performed only when common load voltage $V_L$ is larger than target voltage $V_{ref2}$ of proportional integral controller 41a and when common load voltage $V_L$ is smaller than target voltage $V_{ref3}$ of proportional integral controller 41c. Therefore, by setting target voltage $V_{ref2}$ of proportional integral controller 41a at the upper limit value of the permissible voltage value of common load voltage $V_L$ and setting target voltage $V_{ref3}$ of proportional integral controller 41c at the lower limit value of the permissible voltage value of common load voltage $V_L$, the proportional integral control is performed such that common load voltage $V_L$ falls within the permissible range, when common load voltage $V_L$ deviates from the permissible range. In addition, when common load voltage $V_L$ is smaller than target voltage $V_{ref2}$ of proportional integral controller 41a and larger than target voltage $V_{ref3}$ of proportional integral controller 41c, the voltage control produces a proportional control response, and thus, the output currents of the plurality of DC/DC converters connected in parallel can be equally shared.

Although the foregoing embodiment has been described in connection with the configuration in which two DC/DC converters 11 are connected to one DC power supply 2, the present invention is not limited thereto. The present invention is also applicable to a configuration in which a plurality of combinations each including one DC power supply 2 and one DC/DC converter 11 connected to each other are connected in parallel as shown in, for example, FIG. 6. Three or more combinations described above may be connected in parallel.

Figure 7:
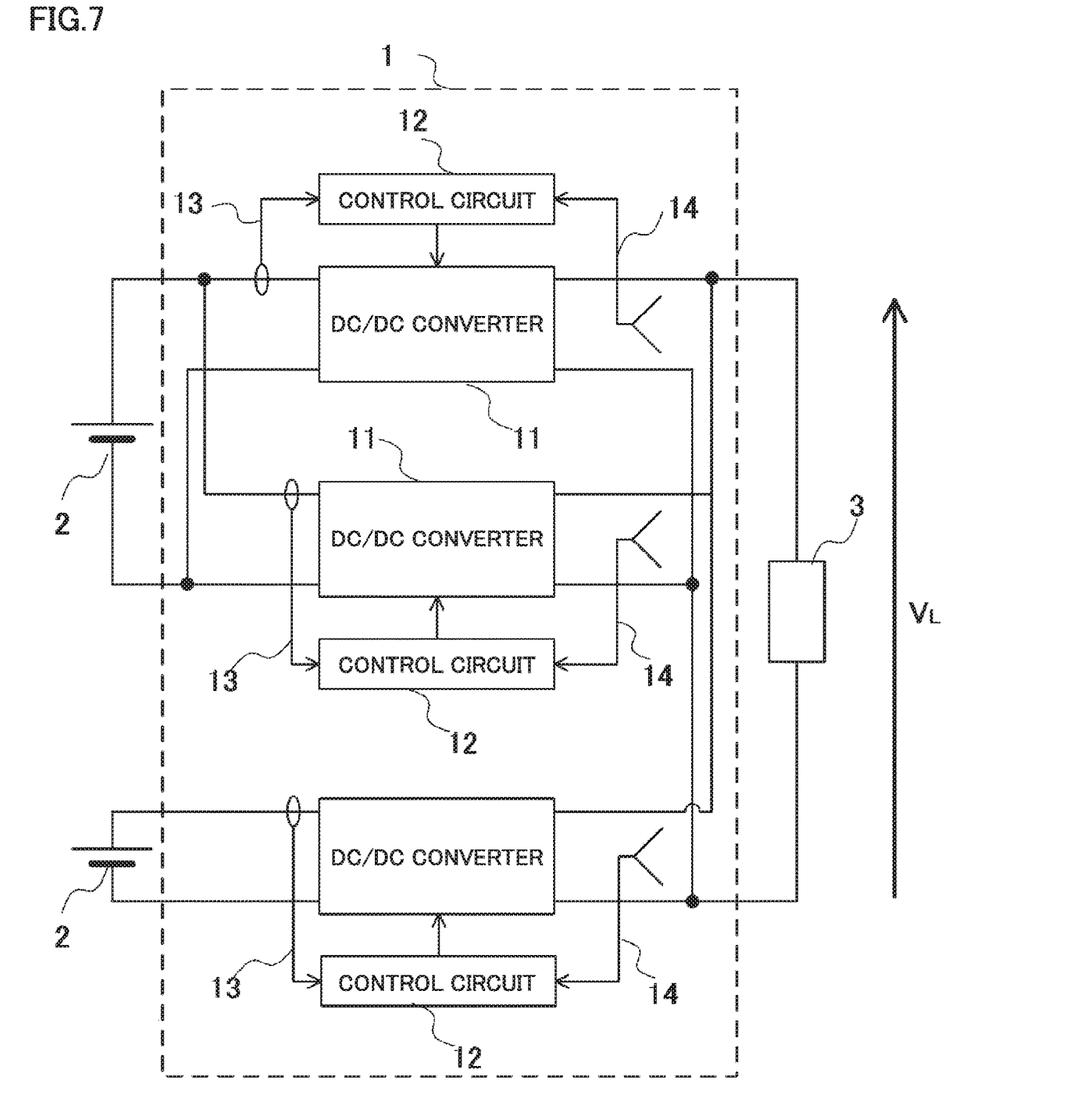
FIG. 7 is a block diagram showing a modification of the configuration of the parallel power supply device according to the first embodiment of the present invention.

In addition, in a configuration of a parallel power supply device shown in FIG. 7, a plurality of DC/DC converters 11 are connected to common DC power supply 2, and one DC/DC converter 11 different from the plurality of DC/DC converters 11 is connected to DC power supply 2 different from DC power supply 2, and these DC/DC converters are connected in parallel to the common load. The present invention is also applicable to the above-described configuration in which the combination of one DC power supply 2 and the plurality of DC/DC converters 11 connected to each other and the combination of one DC power supply 2 and one DC/DC converter 11 connected to each other are connected in parallel. Although FIG. 7 shows the configuration in which the combination of one DC power supply 2 and the plurality of DC/DC converters 11 connected to each other and the combination of one DC power supply 2 and one DC/DC converter 11 connected to each other are connected in parallel, the number of the combinations connected in parallel is not limited to two. Three or more combinations may be connected in parallel.

Second Embodiment

The first embodiment has been described in connection with the configuration in which the control circuit has the voltage controller. However, in a parallel power supply device described in a second embodiment, a control circuit includes a current controller that controls a converter input current, in addition to a voltage controller.

Figure 6:
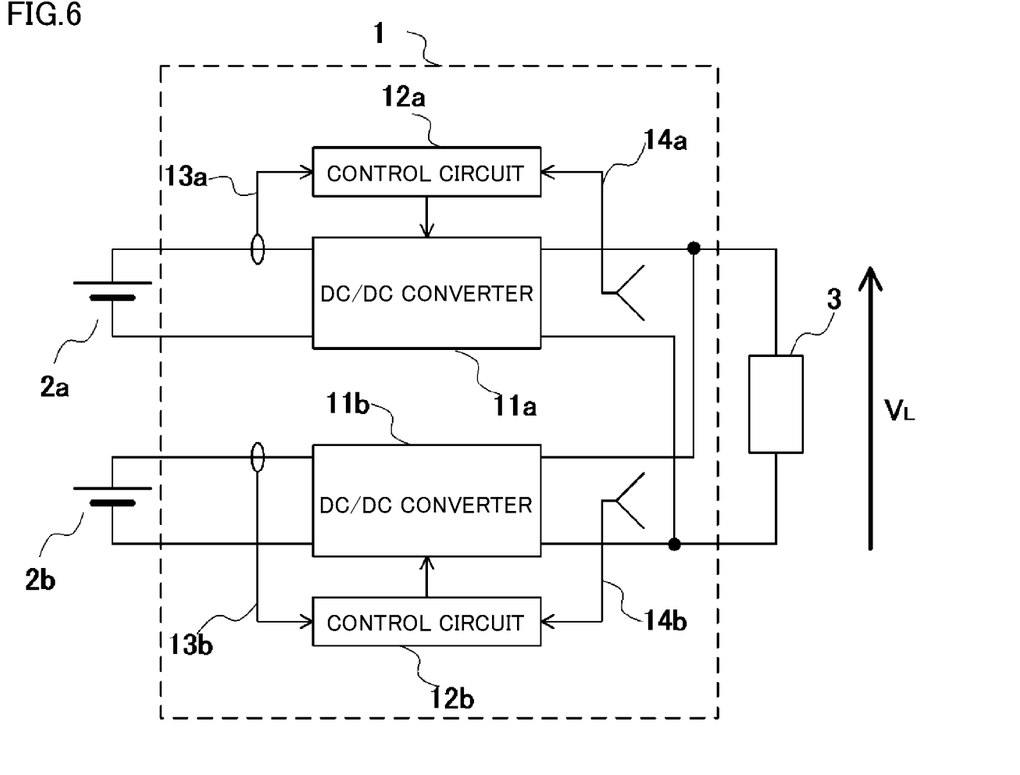
FIG. 6 is a block diagram showing a modification of the configuration of the parallel power supply device according to the first embodiment of the present invention.
Figure 8:
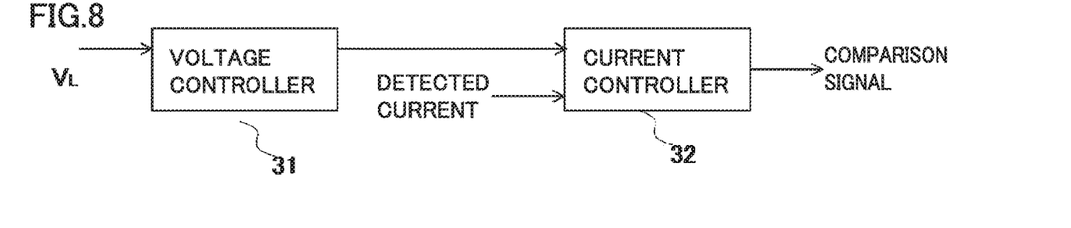
FIG. 8 is a block diagram showing a configuration of a control circuit of a parallel power supply device according to a second embodiment of the present invention.

The parallel power supply device according to the second embodiment is configured similarly to that described in the first embodiment, except for the configuration of control circuit 12, and is configured similarly to the parallel power supply devices shown in FIGS. 1, 6 and 7, for example. FIG. 8 shows the configuration of control circuit 12 for DC/DC converter 11 in the second embodiment. Control circuit 12 for DC/DC converter 11 in the above-described first embodiment includes voltage controller 31 as shown in FIG. 6. In contrast, in the parallel power supply device described in the second embodiment, control circuit 12 for DC/DC converter 11 includes a current controller 32, in addition to voltage controller 31.

Next, the operation will be described. The operation of the parallel power supply device according to the second embodiment is similar to that described in the first embodiment, except for the operation of control circuit 12, and thus, description will not be repeated. In addition, the operation of voltage controller 31 of the control circuit is similar to that described in the first embodiment, and thus, description will not be repeated. Current controller 32 is a portion that performs current control such that a converter input current becomes equal to a converter input current command value. Current controller 32 calculates an error between the converter input current command value and the input current detected by current detector 13, using the output of voltage controller 31 as the converter input current command value. Based on the calculated error, current controller 32 controls corresponding DC/DC converter 11 such that the error becomes zero.

The parallel power supply device according to the second embodiment is configured and operates as described above, and thus, the output currents of the plurality of DC/DC converters connected in parallel can be equally shared, similarly to the first embodiment. Furthermore, the control system is a second-order lag system when current controller 32 is absent, whereas the control system is a first-order lag system when current controller 32 is present. Therefore, the effect of further improving the control stability as compared with the first embodiment is obtained.

REFERENCE SIGNS LIST 1 parallel power supply device, 2 DC power supply, 3 common load, 11 DC/DC converter, 12 control circuit, 13 current detector, 14 voltage detector, 21 first full-bridge circuit, 22 second full-bridge circuit, 31 voltage controller, 32 current controller, 40 voltage computing unit, 41 over/under-voltage computing unit, 40a proportional controller, 40b limiter, 41a proportional integral controller, 41b limiter, 41c proportional integral controller, 41d limiter.

The invention claimed is:

1. A parallel power supply device comprising:
a plurality of DC/DC converters each including at least one switching device and connected in parallel to perform power conversion between a DC power supply and a common load;
a voltage detector to detect a voltage of the common load; and
a plurality of control circuits each to control a switch timing of the at least one switching device in a corresponding one of the plurality of DC/DC converters, wherein
during parallel operation of the plurality of DC/DC converters, the plurality of control circuits control the plurality of DC/DC converters by individually performing proportional control on the plurality of DC/DC converters using a same target voltage value and a same proportional gain, based on a voltage value of the common load detected by the voltage detector, without obtaining information about switch timing, input currents and output currents of DC/DC converters other than a corresponding one of the plurality of DC/DC converters, and
each of the plurality of control circuits includes a proportional controller, a first proportional integral controller, and a second proportional integral controller arranged in parallel to each other.

2. The parallel power supply device according to claim 1, wherein
during parallel operation of the plurality of DC/DC converters, the plurality of control circuits controls the plurality of DC/DC converters by individually performing proportional control on the plurality of DC/DC converters using a same target voltage value and a same proportional gain, based only on a voltage value of the common load detected by the voltage detector and an input current or an output current of a corresponding one of the plurality of DC/DC converters.

3. The parallel power supply device according to claim 1, wherein:
the proportional controller performs proportional control using a predetermined first target voltage value; and
the first proportional integral controller performs proportional integral control using a second target value larger than the first target voltage value.

4. The parallel power supply device according to claim 3, wherein:
the second proportional integral controller performs proportional integral control using a third target voltage value smaller than the first target voltage value.

5. A parallel power supply device, comprising:
a plurality of DC/DC converters connected in parallel to perform power conversion between a DC power supply and a common load;
a voltage detector to detect a voltage of the common load; and
a plurality of control circuits each to control a corresponding one of the plurality of DC/DC converters, wherein
during parallel operation of the plurality of DC/DC converters, the plurality of control circuits control the plurality of DC/DC converters by performing proportional control using a same target voltage value and a same proportional gain, based on a voltage value of the common load detected by the voltage detector,
each of the plurality of control circuits includes a voltage controller to control the voltage of the common load, and
the voltage controller includes:
a proportional controller to perform proportional control using a predetermined first target voltage value;
a first proportional integral controller to perform proportional integral control using a second target voltage value larger than the first target voltage value; and
a second proportional integral controller to perform proportional integral control using a third target voltage value smaller than the first target voltage value, and the proportional controller, the first proportional integral controller, and the second proportional integral controller are arranged in parallel to each other.

6. The parallel power supply device according to claim 5, wherein
the second target voltage value is set at a same voltage value as an upper limit value of a permissible voltage value of the common load, and the third target voltage value is set at a same voltage value as a lower limit value of the permissible voltage value of the common load.

7. The parallel power supply device according to claim 5, wherein
each of the plurality of control circuits includes limiters to limit ranges of outputs from the first proportional integral controller and the second proportional integral controller,
an upper limit value of the limiter to limit the output from the first proportional integral controller is set at 0, and
a lower limit value of the limiter to limit the output from the second proportional integral controller is set at 0.

8. The parallel power supply device according to claim 7, wherein
a lower limit value of the limiter to limit the output from the first proportional integral controller is set at a lower limit value of an input current rating of a corresponding one of the plurality of DC/DC converters, and
an upper limit value of the limiter to limit the output from the second proportional integral controller is set at an upper limit value of the input current rating of a corresponding one of the plurality of DC/DC converters.

9. The parallel power supply device according to claim 5, wherein
each of the plurality of control circuits includes a current controller, and controls the voltage of the common load by performing current control using an output from the voltage controller as a converter input current command value of a corresponding one of the plurality of DC/DC converters.

10. The parallel power supply device according to claim 5, wherein the proportional controller, the first proportional integral controller, and the second proportional integral controller each receive, in part, the voltage value of the common load detected by the voltage detector as an input.

11. The parallel power supply device according to claim 5, wherein outputs of each of the proportional controller, the first proportional integral controller, and the second proportional integral controller are summed to produce a current command value of the corresponding one of the DC/DC converters.

12. The parallel power supply device according to claim 5, wherein the predetermined first target voltage value, the second target voltage value, and the third target voltage value are each fixed reference voltage values.

* * * * *